United States Patent [19]

Mitchell

[11] Patent Number: 4,973,813
[45] Date of Patent: Nov. 27, 1990

[54] SYSTEM FOR MONITORING WELD PARAMETERS

[76] Inventor: Shirley Mitchell, 530 Burkhardt Ave., Dayton, Ohio 45403

[21] Appl. No.: 412,113

[22] Filed: Sep. 25, 1989

[51] Int. Cl.$^5$ .............................................. B23K 11/25
[52] U.S. Cl. ................................................... 219/109
[58] Field of Search .................... 219/109, 110, 130.01

[56] References Cited

U.S. PATENT DOCUMENTS

| | | | |
|---|---|---|---|
| 1,919,978 | 7/1933 | Dempster | 219/109 |
| 1,938,499 | 12/1933 | Ragsdale | 219/109 |
| 2,748,380 | 5/1956 | Platte et al. | 219/109 |
| 4,739,149 | 4/1988 | Nishiwaki et al. | 219/130.01 |

Primary Examiner—Clifford C. Shaw
Attorney, Agent, or Firm—Donald P. Gillette

[57] ABSTRACT

An indicating system has a current pick-up inductively coupled to one of the cables of a welding system. A predetermined fraction of the voltage from the pick-up is applied to a programmed circuit arrangement which includes a timer and which controls a warning device to indicate when the predetermined fraction of the pick-up voltage has been less than a predetermined value for a predetermined time after current has begun to flow in the cable.

15 Claims, 2 Drawing Sheets

SYSTEM FOR MONITORING WELD PARAMETERS

BACKGROUND OF THE INVENTION

This invention relates to a process and apparatus for monitoring the quality of welds, in particular those produced by robot welding machines on an assembly line.

In the manufacture of large sheet metal structures, such as the bodies of automobiles and trucks, the standard procedure is to assemble several pre-shaped panels by means of a minimum number of initial welds and then to place these partially assembled structures in specific locations on movable supports that carry them along an assembly line. As each support moves along the assembly line, it stops at a series of precisely defined stations, and at each station, additional welds are made in the work piece where the designers have determined them to be necessary to hold the panels together with the required rigidity and strength. Manufacturing technique has advanced to the point that every part of the structure is so precisely located at each stop that the welds can be made by welding guns supported and positioned by robots. The robot at that station can be programmed to bring a welding gun into certain positions in space, and the parts of the work piece to be welded by that gun will be positioned there, ready for the gun to make a specific pattern of additional welds.

Both the initial welds and the additional ones are spot welds produced by placing electrodes against opposite surfaces of a stack of two or more metal panels and forcing a high current through the electrodes and the small area of the panels directly between their tips to melt the metal in that area and blend it into a single lump, called a nugget. Before the current is turned on, mechanical pressure is applied to the electrodes to cause them to clamp the panels firmly together to establish the required conductive path through the panels.

The parameters of each weld are specific and must be maintained constant for the corresponding weld in every replica of the structure being manufactured. One of the most important parameters is the magnitude of the welding current, which is typically in the range of about 5KA to about 15KA. It is well known that too low a current will produce unsatisfactory and even dangerously weak welds, but surprisingly, the actual welding current is not being measured on existing automotive assembly lines during the manufacturing process. Instead, the proper current for a given location on a newly designed work piece is determined during the design and manufacturing set-up phase by measuring the current as sample welds are made and selecting the value of current found to make welds of the proper quality. The measurement is done by means of sensing apparatus not suitable for use during the formation of every weld during the manufacturing process. The conditions necessary to cause that current to flow are then programmed into a weld timer panel associated with the robot that will make replicas of that weld on the assembly line. From then on, while replicas of that structure are being produced, sometimes in very large numbers, reliance is placed on holding constant the parameters that determine the current and on checking the finished welds by human observation and test on the welded work pieces during assembly. Unfortunately, some of those parameters change with wear and age, and human observation is fallible, so that weak or even non-existent welds sometimes get past the inspectors.

This is a very serious matter. If bad welds escape detection, the vehicle that is supposed to be held together by them will not be as strong as it should be. At best, the vehicle may wear out sooner than it should, and the manufacturer will get a reputation for bad quality. At worst, in an accident, the weakened structure may fail to protect its occupants from injury. There is a growing body of law to the effect that manufacturers who deliberately fail to take care to manufacture products so that they will be as safe as they can reasonably be expected to be will not only be subjected to severe civil penalties but may even be held criminally liable.

In accordance with Ohm's Law, the magnitude of any current is determined by the voltage driving that current and the impedance of the circuit through which the current flows. The impedance through which spot-welding current must flow is determined principally by the characteristics of the metal panels, the pressure exerted on them by the electrodes, the cross-sectional area of the electrodes, especially at the region of contact between each electrode and the panel contacted by it, and the resistance of the welding cable connecting the electrodes to the power supply. The ohmic value of the impedance through which the voltage must drive the welding current need not be measured; all that is required is that the voltage have the proper value to cause the required welding current to flow through the circuit.

In A. C. welding, the power is supplied through a transformer and a silicon-controlled rectifier circuit. The current does not necessarily flow continuously during the formation of each weld but only during controlled intervals of time. The duration and timing of these intervals are controlled by the weld timer that governs the operation of the SCR circuit and the welding gun. The weld timer begins each operation in response to a signal from the robot that supports and positions the welding gun, and the robot, in turn, is controlled to start its program of making a pattern of welds by a signal from a programmable logic computer (PLC) when a work piece has moved into position in that robot's station. As presently used, the PLC, which is basically a computer, does not receive any feedback of information from the welding circuit and, therefore, does not sense any change in the welding current, although the PLC can respond to input signals rapidly enough to sense such change.

One of the most common reasons for change in the welding current is that the cable that carries current from the control panel to the welding gun wears out. The cable has to be flexible to accommodate the movements of the robot, and such cables are made of a bundle of slender, flexible wires enclosed in an opaque, insulating sheath that carries water to cool the cable during operation. The magnetic fields produced along the cable by the welding currents interact with each other and cause the cable to jump each time a current pulse passes through it, and this jumping, plus the less sudden movement caused by operations of the robot, gradually break the wires in the cable and raise its resistance to the flow of current. Instead of having most of the impedance of the welding circuit concentrated in the path of the current through the panels, some of it will be distributed along the cable. It is immaterial where the impedance is located; the magnitude of current will be inversely proportional to the total impedance, and as the cable impedance increases, the current carried by it to the welding site will decrease. There is some tolerance in the magnitude of current required to make a satisfactory weld, and if the strands in the cable break one at a time, the welds produced by the gun fed by that cable will not suddenly change from good to bad but will do so progressively. However, the cables do sometimes break suddenly. Other factors, such as the pneumatic pressure that forces the electrodes and the panels together firmly enough to reduce the impedance to the proper value at that critical part of the welding circuit, can also go bad slowly or suddenly.

Sudden equipment failures that drop the welding current to zero cause the welds to be entirely missing, and missing welds are easier for inspectors on the assembly line to detect than are welds that are present but are just not quite as strong as they should be. In order to limit the number of slightly weak welds that can occur in a structure being assembled, it is common for the inspectors to apply a harsher test, not on every weld, but from time to time. In that type of test, the inspectors use a hammer and chisel to try to force apart the panels that should be welded together. If the panels separate too easily, the weld will be shown to have been too weak, and it must be re-welded by human welders in a repair section. Even if the weld is strong enough to make the effort to pry the panels apart unsuccessful, the structure may still have to be worked on to eliminate the damage to the metal caused by the destructive effort.

Nishiwaki et al. have proposed a sensing circuit in U.S. Pat. No. 4,739,149 to sense the magnitude of welding current by generating a voltage across a coil magnetically coupled to a cable carrying the welding current. A fraction of the secondary voltage thus generated is rectified and applied to a circuit having one or two light-emitting diodes. The amplitude of the induced voltage is non-linearly proportional to the amplitude of the welding current, and in a simple circuit, the brightness of the LED is proportional to this voltage. In a more complex circuit, the LED is prevented from turning on until the welding current reaches a certain value, and in a still more complex circuit, one LED is lighted if any welding current is flowing and a second LED is lighted only if the welding current exceeds a certain value. In any of the circuits, the person operating the welding apparatus has to watch the lamp or lamps carefully to determine whether a sufficient welding current is flowing in the cable. This would be very difficult to do during a real manufacturing operation.

OBJECTS AND SUMMARY OF THE INVENTION

It is an object of this invention to provide means to indicate whether short pulses of welding current are flowing at the proper time and whether they have the magnitude that has been determined to be high enough to form good welds.

Another object is to provide means utilizing the programmable logic controller of automatic production machinery to provide a quick response time to measure short pulses of high current.

Still another object is provide a method of generating a warning signal in response to welding current pulses of inadequate amplitude.

Still further objects will be apparent to those skilled in the art after they have read the following description of this invention.

In accordance with this invention, a pick-up coil is attached to one of the final portions of a welding cable leading to a welding gun. A substantial part of a typical welding cable that supplies current to a welding gun supported and positioned by a robot is coaxial, with current flowing in one direction in the central conductor and in the opposite direction at the same time in the outer conductor. The magnetic fields of the inner and outer conductors cancel each other out and produce no movement of the coaxial cable. However, at some point near the welding gun, the inner and outer conductors must be connected to separate conductors, one of which is connected to one electrode in the gun and the other to the other electrode. These separate conductors are referred to in this description as the final portions of the welding cable, since they are near its outer end. The welding current flows in short bursts, or pulses, in one direction at a time in these final portions, and the resulting magnetic fields cause these portions of the cable to jump.

The magnetic flux surrounding the final portions of the cable due to the short pulses of the welding current induces in the coil a voltage, the magnitude of which is proportional to the amplitude of the welding current. The terminals of the coil are connected to the PLC, which is connected to some form of warning means to be actuated by the PLC when no welding current burst with a high enough amplitude for a good weld is produced within a predetermined time after the robot has received a signal indicating that it should start producing a pattern of welds.

Normally, the PLC requires an input voltage of at least a certain minimum magnitude to produce a response, but what is needed is a response (to actuate the warning means) when current of at least the minimum magnitude fails to flow. The operation of the system cannot simply be reversed, so as to actuate the warning means all of the time that there was not a minimum current flowing. If that were done, there would be a constant warning except during the relatively short intervals when a proper pulse of welding current was flowing through the cable.

In accordance with this invention, operation of a timer or counter circuit is initiated when the welding operation on each work piece is supposed to start. The timer or counter circuit will be reset each time the PLC detects a satisfactory current, but the warning means will be actuated if the PLC does not detect a high enough voltage across the coil before too much time has passed or before the counter counts too many events (for example, two triggerings of the welding gun),

DETAILED DESCRIPTION OF THE INVENTION

Figure 1:
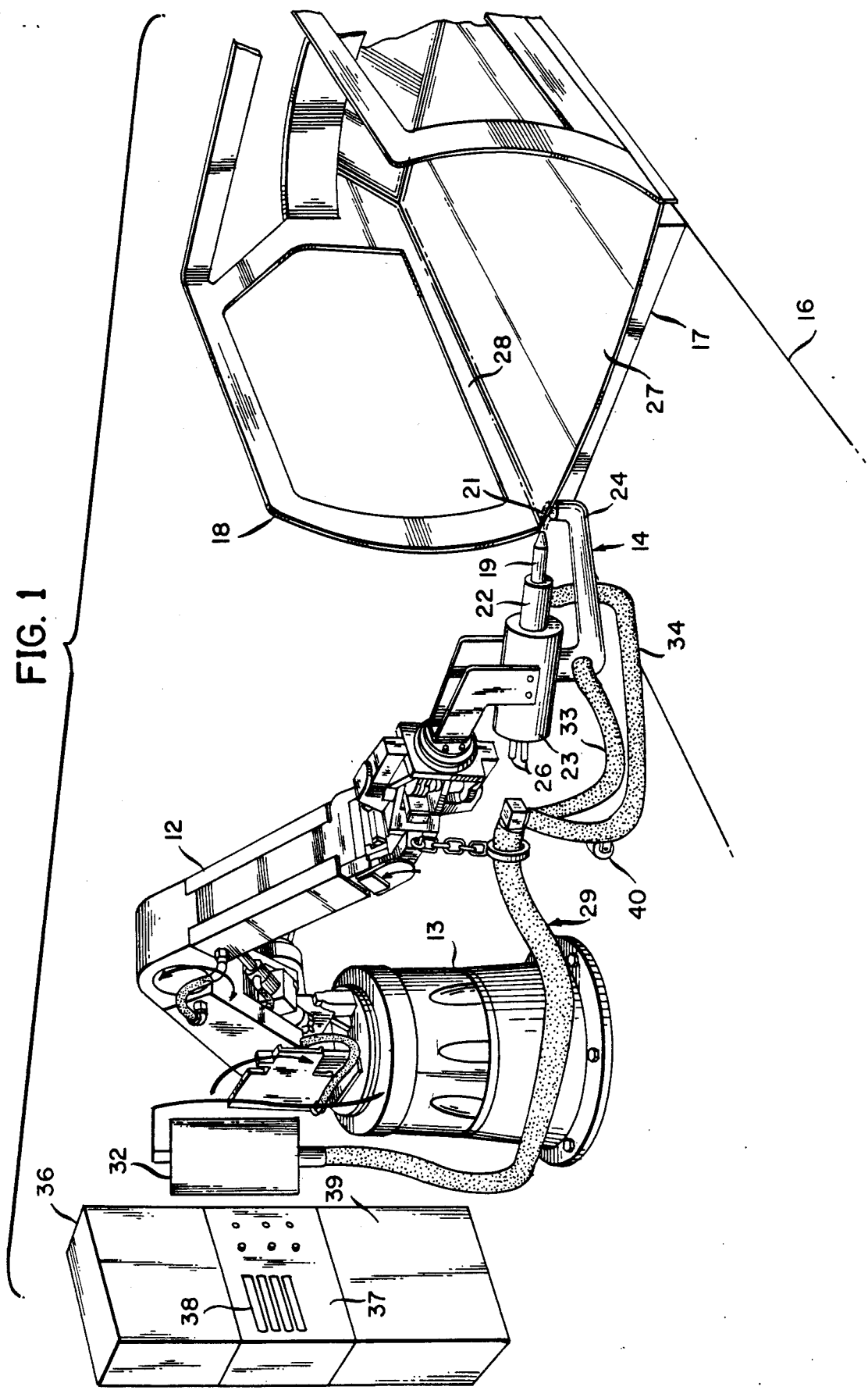
FIG. 1 shows a welding station on an assembly line.

The welding station in FIG. 1 includes a robot 11 that has an articulated arm 12 rotatably mounted on a base 13 and supporting a welding gun 14 at it its outer end. The robot is not, in itself, a part of this invention and will be discussed only to the extent necessary to describe the method and apparatus defined in the claims. FIG. 1 also shows a small fragment of an assembly line 16 and part of a carrier 17 mounted on the assembly line to be moved along by the line to station after station, such as that occupied by the robot 11. A structure, or work piece, 18, which, in this instance, is part of the cab of a truck is shown mounted in an exact and fixed position on the carrier 17 to be moved along the line as the carrier moves.

At each station, the carrier stops in a fixed position, thereby causing the work piece 18 to be positioned at an exact location. This makes it possible for the arm 12 of the robot 11 to be moved to an equally exact location to place the gun 14 so that it can make a weld at a desired location , or usually a pattern of such locations, on the work piece. The gun includes a pair of cylindrical electrodes 19 and 21 aligned on a common axis. The electrode 19 is inserted in the end of a piston 22 that extends from one end of a pneumatic cylinder 23, and the electrode 21 is rigidly mounted on a C-shaped arm 24 rigidly attached to the cylinder 23 to hold the electrode 21 in a fixed position relative to the cylinder. Air under pressure is supplied to the cylinder 23 through pneumatic tubes 26 to force the piston 22 forward toward the work piece 18 when the gun is in the proper position to make a weld. After the weld has been made, the piston retracts to withdraw the electrode and release the work piece 18. Since the position of the electrode 21 is fixed, movement of the piston 22 toward the work piece 18 causes pressure, typically of the order of 600 pounds, to be exerted on opposite surfaces of the part of the work piece directly between the juxtaposed ends of the electrodes 19 and 21. In the work piece 18 illustrated in FIG. 1, the parts being welded are edges of a floor panel 27 and a side panel 28.

The pressure exerted on the panels affects the electrical impedance through the stack of panels at the location of the weld. This impedance is much higher than that of other parts of the circuit and is critical to the formation of a weld, since it plays the most important part in determining the magnitude of the welding current for a given driving voltage. The magnitude of this impedance is controlled, in part, by the pressure exerted by the electrodes, and providing a warning of low welding current also provides a warning if the pneumatic pressure on the piston 22 drops below its proper value for any reason.

Another part of the circuit that can affect the magnitude of the welding current is a cable 29 that connects the electrodes to the secondary of a transformer 31 and consists of a main, coaxial portion 32 and separate portions 33 and 34, referred to in this description as final portions because they are the parts of the cable 29 closest to the electrodes 19 and 21.

The reason for using a coaxial portion is to reduce the effect of magnetic fields produced in the cables by the large welding currents flowing through them. Current flow through any conductor produces a magnetic field around the conductor, and when the current is very high, as in the case of welding current, the magnetic fields around different parts of the conductor are so strong that the field around one part will exert a substantial mechanical force on another part of the same conductor. In the case of flexible conductors, like the cables 33 and 34, the strong magnetic fields cause these cables to jump each time a current pulse flows through them. Such jumping does not occur in a coaxial cable, because the current flows in opposite directions in the inner and outer conductors and produces no external magnetic field. As a result, the cable 32 does not jump when current flows through it.

The cables are suspended from the arm 12 by a chain 36 attached to the cable 32 near its outer end where it is joined to the final portions 33 and 34, and the outer ends of these portions are connected to the arm 24 and the piston 22, respectively. All of the cables are enclosed in flexible water jackets made of rubber or the like to carry cooling water along the entire lengths of the cables. The conductive material in the cables consists of multiple strands of relatively thin wire to provide the necessary flexibility to allow the cables to move as directed by the arm 12.

The arm, the pneumatic piston 22, and the flow of current to the electrodes 19 and 21 are all controlled by means illustrated, for simplicity, as a control panel 36, only a small part of which is visible in the drawing. The control system includes simplified representation of a PLC 37, which is shown incorporated in the control panel. As is standard, the PLC includes a cathode-ray tube 38 on which a pattern representative of the operation logic of the system is shown. A typical PLC is the PLC-2/20 sold by the Allen-Bradley Company of Cleveland, Ohio, and a typical CRT display used with the PLC is a Model 1770-T1 Industrial Terminal System, also sold by Allen-Bradley. The PLC-2/20 is described in Allen-Bradley's Bulletin 1772 and the 1770-T1 is described in their Bulletin 1772, both of which are incorporated herein by reference. The panel 36 also includes a simplified representation of a standard weld timer 39.

In normal use of the apparatus in FIG. 1, the assembly line 16 conveys a series of carriers 17 to the work station at which the robot 11 is located, and on each carrier is a partially assembled cab 18. The carrier is stopped at a specific location, and sensing means (not shown) associated with the line notifies the robot that a new work piece is ready to receive the welds for which the robot is programmed. The sensing signal actuates the control apparatus in the control panel to move the arm 12 so that the electrodes 19 and 21 of the gun 14 are positioned at precisely the correct location of the first weld to be made by that gun on the work piece 18. The control apparatus actuates the pneumatic controls to force the piston 22 and the electrode 19 carried by it toward the other electrode 21 on the other side of the panels 27 and 28 that are to be welded together. When the pressure on the panels reaches the value for which the system is programmed, the control system causes transformer 31 to be actuated to apply the proper driving voltage to the cable 29. Assuming the cable and the electrodes 19 and 21 are in good condition, this voltage will cause a welding current to flow through the cable, the electrodes, and the limited area of the panels 27 and 28 between the juxtaposed ends of the electrodes.

A typical rate of production of work pieces 18, such as the truck cabs shown, is about one per minute. During the minute a work piece remains in the station of the robot 11, the gun 14 may be required to make anywhere from a few welds to as many as about twenty in a pattern that can be reached easily by the gun.

Inspectors farther down the line 16 receive each work piece 18 in due course and visually check every weld made by the robot 11 and robots at other stations along the line to see if the welds have been properly made. Since visual inspection cannot catch all possible flaws in welds, the inspectors check a certain number of the welds by using a hammer to try to drive a chisel or screwdriver between the panels adjacent those welds. If the panels can be separated, it is because the welds are too weak, and corrective measures have to be taken with respect to the apparatus at the station where the defective welds were made. In the meantime, before the inspectors catch the bad welds, other work pieces will have passed through that station and will also have defective welds. In addition, the inspectors are subject to normal human error, themselves, and they fail to see some welds that are visibly defective.

A number of things can go wrong to prevent welds from being good. For one thing, the electrodes 19 and 21, which are small cylinders, are somewhat tapered at the ends that contact the panels, and these ends mushroom out as a result of being used. They have to be ground back to the proper shape, periodically, and eventually replaced. The pneumatic system can fail to press the electrodes firmly enough against the panels, resulting in too high an electrical impedance in the part of the panels between the electrodes. The SCR circuit that supplies power to the transformer 31 can go bad, as can other parts of the system associated with the robot 11. Some of these things can be observed by the people overseeing the operation of the robot, but others cannot. A common source of bad welds is the decrease in conductivity of the cable 29 resulting from breakage of more and more of the individual strands, which cannot be seen because they are within the opaque rubber water jackets. But whatever the cause, the result is virtually always a reduction in the strength of the welds due to a reduction in the welding current.

In accordance with this invention, a current sensor in the form of a coil 40 is secured to one of the final cable portions 33 or 34, in this instance, to the cable 34. By Lenz's Law, a voltage proportional to the rate of change of magnetic flux linked with the coil and to the number of turns in the coil is induced in the coil 40, and this voltage actuates fast-acting circuit means if the coil voltage is high enough, corresponding to proper welding current. The magnitude of correct welding current is so high that the coil 40 only needs to couple a small part of its magnetic flux to generate a high enough voltage. In addition, the axis of the coil 40 is preferably parallel to the circumference of the cable on which it is mounted so as to couple most efficiently with the flux field surrounding that cable and thereby maximize the voltage available at the terminals of the coil. Wires from the coil terminals are led back along the external surface of the coaxial cable portion 32 to the control panel, and in order to avoid having extraneous voltage induced in those wires, the coil is located at the inner end of the final portion 34, within about a foot from the junction of the coaxial portion 32 with the two final portions 33 and 34. Even though the final portions jump each time a pulse or burst of current passes through them, locating the coil close to the coaxial portion 32 that does not jump limits the movement to which the coil 40 and the lead wires connected to its terminals is subjected.

The fact that a separate pattern of welds has to be made in each work piece 18 within about a minute automatically means that the welding current will flow for only short intervals of time. In the system being described, the current is alternating current, and during each short interval, a burst of current oscillations flows in the cable 29. In addition, it is common to use what is referred to as a double bump operation, so called because the current to make each weld consists of two separate bursts. The duration of each burst depends on the material being welded and on other factors and may be from about one cycle, i.e., one-sixtieth of a second for 60-Hertz A.C. to about twenty cycles. Each pattern of welds may have as many as about twenty welds, all to be completed in about one minute, or approximately three seconds per weld, which is 180 cycles at 60 cycles per second. Thus, even a weld that requires a burst of twenty cycles requires the current to flow not much more than about 10% of the time. This is not enough to overcome the inertia in the movable parts of an analog meter, as would be required to give an accurate reading indicative of the magnitude of the current, nor is it enough time to allow a digital meter to produce an accurate reading. That is why the signal voltage induced in the coil 40 has to be connected to a fast-acting circuit.

The main purpose of this invention is to provide an indication of inadequate welding current, or even no welding current at all, when there should be a high welding current. By definition, the fact that low-current or no-current conditions cause the voltage induced in the coil 40 is low or zero means that the coil 40 produces little or no signal when a signal is most needed but produces its largest signal voltage when there is no need to actuate warning means. This makes it necessary to provide an indicating circuit that will work when the welding current is too low, or even zero, but will not give a false indication just because there is no welding current, which is most of the time. A circuit suitable for achieving this result is shown in FIG. 2.

Figure 2:
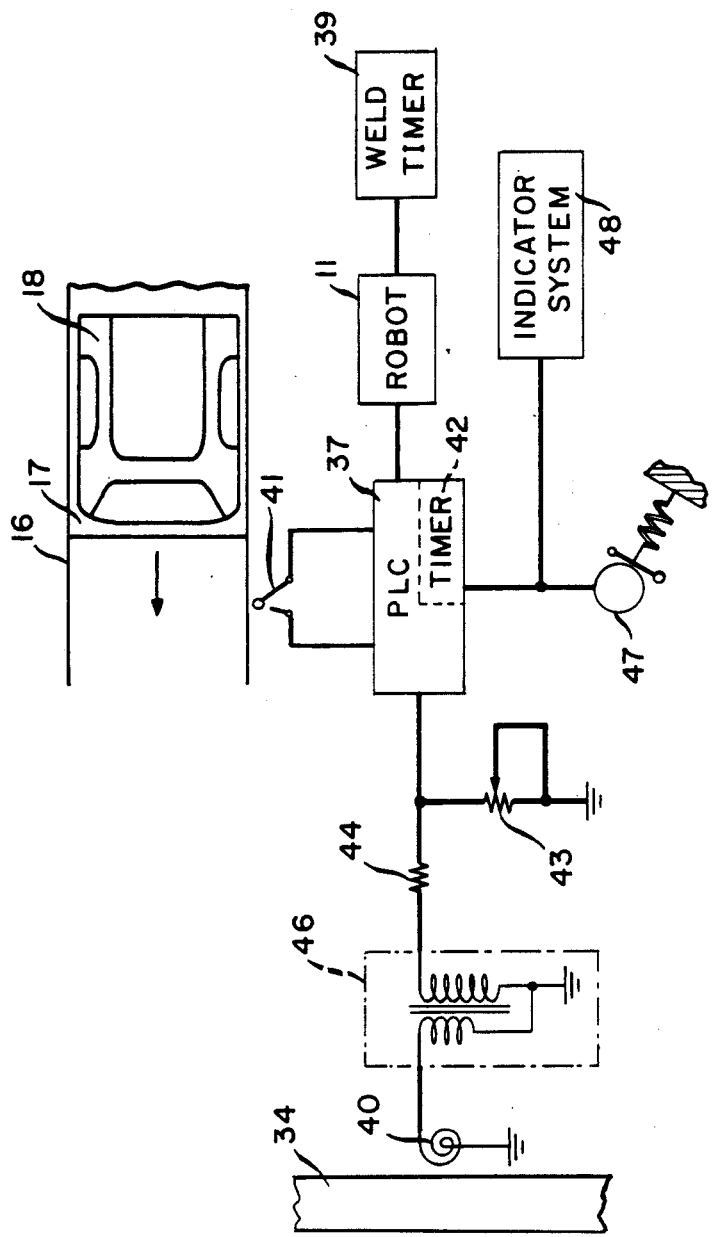
FIG. 2 is a symbolic circuit used in conjunction with the welding station in FIG. 1 to indicate the fact that the amplitude of the welding current is too low to produce a satisfactory weld.

FIG. 2 is a simplified circuit diagram of the basic parts of one embodiment of the testing circuit used according to this invention. Each support 17 carrying a work piece 18 along the assembly line 16 actuates sensing means illustrated as a limit switch 41 when the support reaches the proper position in the station occupied by the robot 11. The limit switch is connected to the PLC, and actuating the switch signals the PLC to initiate the sequence of operations at that station. The PLC does so by signaling the robot to bring its welding gun into position to begin welding, and the robot signals the weld timer 39 to begin the sequence that starts with sending air to the cylinder 23 in FIG. 1. After the pressure applied to the electrodes has reached the predetermined value, the, weld timer initiates the welding current through the cable, of which only a fragment of the final portion 34 is shown in FIG. 2.

The robot 11 also signals a timer 42 to begin measuring a pre-set interval. The timer 42 is shown as being a part of the PLC 37, although it could be a separate piece of hardware. As part of the PLC, the timer 42 can also be a software timer created by programming the PLC so that some of its internal components measure the pre-set interval. This interval may be any desired part of the time welds are being made on each work piece 18; I have found that 10 seconds is satisfactory.

The timer 42 is also connected to measuring means for measuring the amplitude of the welding current. These means include the coil 40 in which a voltage is induced by the current flowing in the cable portion 34. This voltage is used as a signal to actuate the fast-acting circuits in the PLC to reset the timer 42 to start measuring the pre-set interval over from its starting value. In order for the PLC to respond to the signal voltage from the coil 40, the amplitude of this voltage must be high enough. The Allen-Bradley PLC referred to previously require an input voltage of about 92 v. A voltage less than this minimum value will not actuate the PLC and thus will be treated as if it did not occur.

The circuit includes means to set the amplitude of the voltage applied to the PLC from the coil 40 at a level such that it will be just high enough to actuate the PLC if the welding current flowing in the final cable portion 34 is at the value that has been determined to be the minimum required to produce a satisfactory weld. This minimum value is not constant for all welds but depends on all of the parameters of the welds to be made on a specific type of work piece 18 by the welding gun 14 in FIG. 1. As a result the means to set the voltage includes adjustable means, illustrated as a variable resistor, or rheostat, 43 in series with a fixed resistor 44. In this embodiment, the voltage fraction across the rheostat is applied to the input circuit of the PLC. If the amplitude of the voltage induced in the coil 40 is not enough to actuate the PLC, even when that voltage is induced by a welding current high enough to produce good welds, the coil voltage may be increased by any one of a number of known means 46. In this embodiment, a step-up transformer is used as the means 46, but the means could also be an amplifier, as long as the combined effect of the circuit between the coil 40 and the PLC 37 is to apply the minimum required voltage to the PLC when the minimum required weld current is flowing in the cable portion 34.

The timer 42 is connected to warning means 47, represented by a sound-generator, to notify the operator responsible for overseeing the robot 11 when timer 30 reaches its pre-set interval without having be reset by a signal front the coil 40 to the PLC that a high enough current has passed through the cable portion 34 to have made a good weld. Thus, if the timer 42 times out, it indicates that the welds that should be made during that pre-set interval are bad for lack of proper welding current. The timer 42 is thus one embodiment of a circuit that is triggered at the start of a welding sequence and must be retriggered by signals representing adequate welding current later during the production of the same sequence of welds when welding current is supposed to flow, or else, a warning will be actuated to indicate that the expected current was either inadequate or nonexistent. To provide such an indication, the timer 42 is connected to indicating means 48 that may include means to keep a running tally of bad welds due to inadequate current or to notify the inspectors to be prepared to re-weld certain welds on certain work pieces. The indicating means can also serve a positive purpose. By keeping a running tally of bad welds correlated with identification of every work piece on which any bad welds are made, it can be used to establish that there were no bad welds on other work pieces.

The most important thing is, that the welding current is measured during the production of every pattern of welds by the robot 11 to which this monitoring system is connected, and the control of quality of the work pieces is enhanced.

I claim:

1. An indicating system for a welding system that includes:
   a welding gun with first and second electrodes to contact a work piece and supply welding current thereto,
   a source of welding current,
   cable means comprising:
      a coaxial cable section connecting the source to the gun to carry the welding current to the gun, and
      a final cable section comprising one cable portion connected in series between the central conductor of the coaxial section and one of the electrodes, and a second cable portion connected in series between the outer conductor of the coaxial section and the second electrode, each of the first and second portions carrying the welding current that passes through the electrodes,
   programmable control means connected to the source to initiate current to the cable means and to control the time, amplitude, and heat value of the current, and
   trigger means to initiate each cycle of operation of the control means, said indicating system comprising:
      (a) pick-up means inductively coupled to one of the cable portions and physically attached thereto on one side thereof to produce a voltage having an amplitude determined by the current flowing through the cable portions and through the electrodes;
      (b) adjustable means connected to the pick-up means to select a predetermined fraction of the voltage produced thereby;
      (c) indicating means; and
      (d) programmed circuit means connected to the indicating means and to the adjustable means, the programmed circuit means comprising timing means to control the indicating means to indicate when the predetermined fraction of the voltage is less than a predetermined value for a predetermined time after the control means has initiated conditions of current flow to the cable means.

2. The indicating system of claim 1 in which the adjustable means comprises means to increase the amplitude of the voltage produced by the pick-up means, whereby the predetermined fraction is greater than unity.

3. The indicating system of claim 1 in which the adjustable means comprises:
   (a) first means to produce an output voltage have a fixed relation to the voltage produced by the pick-up means; and
   (b) adjustable voltage dividing means connected to the first means to select a predetermined fraction of the output voltage thereof.

4. The indicating system of claim 3 in which the first means is a transformer.

5. The indicating system of claim 4 in which the transformer is a step-up transformer.

6. The indicating system of claim 1 in which the adjustable means comprises:
   (a) an amplifier; and
   (b) means to control the gain of the amplifier.

7. The indicating system of claim 1 comprising means to reset the timing means to calculate a new time interval each time the predetermined fraction of the voltage produced by the pick-up means exceeds a certain value corresponding to the passage of a welding current of a satisfactory value through the cable portions.

8. In a welding system in which a weld is to be made by supplying a welding current having a predetermined magnitude and heat value to a work piece for a predetermined time, the method of indicating when the current passing through the work piece to make a weld is inadequate for a satisfactory weld, said method comprising the steps of:

(a) generating, by induction, a voltage corresponding to the current passing through the work piece during the time the welding current is supposed to pass therethrough;

(b) modifying the amplitude of the voltage to a predetermined relation to the generated voltage;

(c) comparing the amplitude of the modified voltage to a predetermined voltage value, and (d) actuating indicating means when the amplitude of the modified voltage is less than the predetermined value for more than a predetermined time after initiating conditions for the flow of welding current.

9. The method of claim 8 comprising the step of warning operating personnel of the failure of the modified voltage to reach the predetermined value within the predetermined time.

10. The method of claim 8 comprising the steps of:

(a) recording each failure of the amplitude of the modified voltage to reach the predetermined value within the predetermined time; and (b) correlating the failure with the work piece on which the failure occurred.

11. In an automatic welding system on an assembly line including a welding gun with first and second electrodes to contact a work piece and supply welding current thereto, a source of alternating welding current, a robot to support the welding gun and to position the electrodes at predetermined locations relative to the work piece, cable means connecting the source to the gun to carry the welding current tot eh gun, the cable means comprising a final cable portion connected to the electrodes and carrying the welding current, programmable control means connected to the robot to control operation thereof and connected to the source to initiate conditions for flow of welding current and to control the time, amplitude, and phase angle of bursts of alternating welding current supplied to the cable means, a warning system comprising:

(a) inductive pick-up means inductively connected to the final cable portion to produce an induced voltage having an amplitude determined by the electrode current flowing to the electrodes;

(b) controllable means connected to the pick-up means to reduce a second voltage having an amplitude that has a predetermined relation to induce voltage produced by the inductive pick-up means;

(c) warning means;

(d) programmed circuit means connected to the warning means and to the controllable means and comprising timing means to actuate the warning means when the amplitude of the second voltage is less than a predetermined value for a predetermined time after the control means has initiated conditions of current flow to the cable means; and (e) sensing means positioned relative to the assembly line to produce an initiating signal when a work piece to be welded reaches a predetermined position relative to the robot, the sensing means being connected to the control means to initiate operation thereof by means of the initiating signal to start the predetermined time.

12. The warning system of claim 11 in which the predetermined value of the second voltage is the minimum operational input voltage of the programmed circuit means.

13. The warning system of claim 11 in which the warning means comprises a warning-sound producing device.

14. The warning system of claim 11 in which the warning means comprises means at a location downstream of the robot on the assembly line to warn repair personnel at that location that a weld of questionable quality has been produced at the location of the robot.

15. The warning system of claim 11 in which the warning means comprises recording means to record the occurrence of welds of questionable quality and to correlate such welds with the work pieces on which they were made.

* * * * *